(12) United States Patent
Teusch et al.

(10) Patent No.: US 11,786,978 B2
(45) Date of Patent: Oct. 17, 2023

(54) HYDRAULIC EXPANDING CHUCK

(71) Applicant: GUEHRING KG, Albstadt (DE)

(72) Inventors: Bruno Teusch, Esslingen (DE); Klaus Matheis, Sauldorf/Rast (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 15/995,322

(22) Filed: Jun. 1, 2018

(65) Prior Publication Data
US 2019/0001420 A1    Jan. 3, 2019

Related U.S. Application Data

(63) Continuation of application No. PCT/EP2016/079205, filed on Nov. 30, 2016.

(30) Foreign Application Priority Data

Dec. 2, 2015 (DE) ...................... 10 2015 120 971.3

(51) Int. Cl.
| | |
|---|---|
| *B23B 31/117* | (2006.01) |
| *B23B 31/30* | (2006.01) |
| *B23B 31/00* | (2006.01) |

(52) U.S. Cl.
CPC ........ *B23B 31/1178* (2013.01); *B23B 31/305* (2013.01); *B23B 31/005* (2013.01); *Y10T 279/1241* (2015.01)

(58) Field of Classification Search
CPC ............. B23B 31/1172; B23B 31/1178; B23B 31/305; B23B 31/005; Y10T 279/1216; Y10T 279/1241
See application file for complete search history.

(56) References Cited

U.S. PATENT DOCUMENTS

| | | | | |
|---|---|---|---|---|
| 4,924,637 A | * | 5/1990 | Ikimi | B23B 31/305 |
| | | | | 451/385 |
| 6,663,548 B2 | * | 12/2003 | Mochida | B23B 31/305 |
| | | | | 409/232 |

(Continued)

FOREIGN PATENT DOCUMENTS

| | | |
|---|---|---|
| DE | 743 530 | 12/1943 |
| DE | 26 44 576 | 4/1978 |

(Continued)

OTHER PUBLICATIONS

Machine Translation, CN201108970Y, Liu, X., Sep. 3, 2008. (Year: 2008).*

(Continued)

*Primary Examiner* — Sunil K Singh
*Assistant Examiner* — Joshua S Hearne
(74) *Attorney, Agent, or Firm* — Brown & Brown IP Law PLLC

(57) ABSTRACT

The invention relates to a hydraulic expanding chuck for gripping a tool, for example a drill or a milling tool, comprising: a clamping part having an expansion sleeve having a central receiving opening for receiving and clamping the tool; and a connection part, in particular having a HSK connection. According to the invention, the expansion sleeve has at least two pressure chambers, which are designed to run around the central receiving opening, which are arranged at an axial distance relative to one another, and which can bulge when the tool received in the central receiving opening is subjected to fluid pressure. The at least two pressure chambers are connected to one another by a fluid channel.

19 Claims, 8 Drawing Sheets

(56) References Cited

U.S. PATENT DOCUMENTS

| | | | |
|---|---|---|---|
| 9,566,650 B2 | 2/2017 | Teusch et al. | |
| 9,943,912 B2 | 4/2018 | Hiamer | |
| 2005/0184472 A1* | 8/2005 | Huijbers | ............... B23B 31/305 |
| | | | 279/4.01 |
| 2013/0292913 A1 | 11/2013 | Teusch | |
| 2015/0028548 A1 | 1/2015 | Haimer | |
| 2016/0193666 A1* | 7/2016 | Haimer | ................. B22F 3/1055 |
| | | | 279/4.03 |

FOREIGN PATENT DOCUMENTS

| | | | |
|---|---|---|---|
| DE | 2700934 A1 * | 7/1978 | ........... B23B 31/305 |
| DE | 19629610 A1 * | 1/1998 | ....... B23B 29/03421 |
| DE | 103 12 743 | 9/2004 | |
| DE | 10 2011 106 421 | 10/2012 | |
| DE | 10 2011 081 523 | 2/2013 | |
| DE | 20 2012 104 969 | 2/2013 | |
| DE | 10 2012 110 392 | 6/2013 | |
| DE | 10 2012 215 036 | 10/2013 | |
| EP | 0 074 332 | 3/1983 | |
| EP | 0890402 A1 * | 1/1999 | ........... B23B 31/305 |
| JP | 10029106 A * | 2/1998 | |
| WO | 2015/166062 | 5/2015 | |
| WO | WO-2015166062 A1 * | 11/2015 | ......... B23B 31/1178 |

OTHER PUBLICATIONS

Machine Translation, DE 2700934, Ramsbro, B., Jul. 13, 1978. (Year: 1978).*
Machine Translation, DE 19629610, Zeiner, J. (Year: 1996).*
Machine Translation, JP H10-29106 A. (Year: 1996).*
Machine Translation, WO2015166062A1. (Year: 2015).*
WO 2015/166062 Translation (Year: 2015).*
International Search Report (PCT/EP2016/079205) and Written Opinion of the International Searching Authority dated Feb. 1, 2017, 16 pages.

* cited by examiner

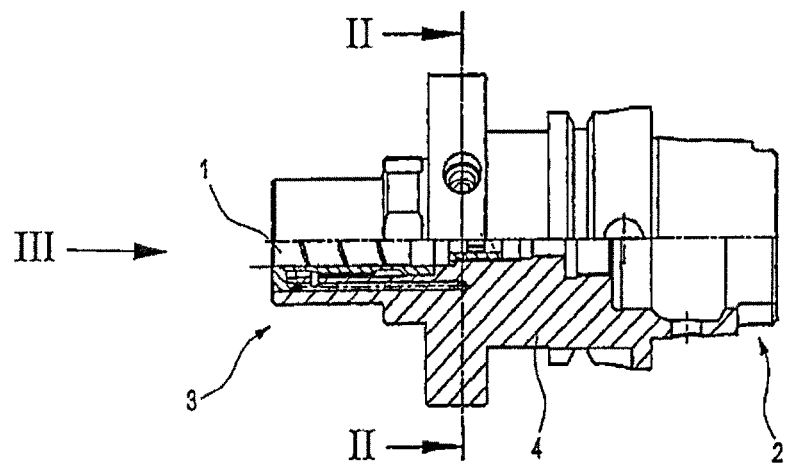
Fig. 1
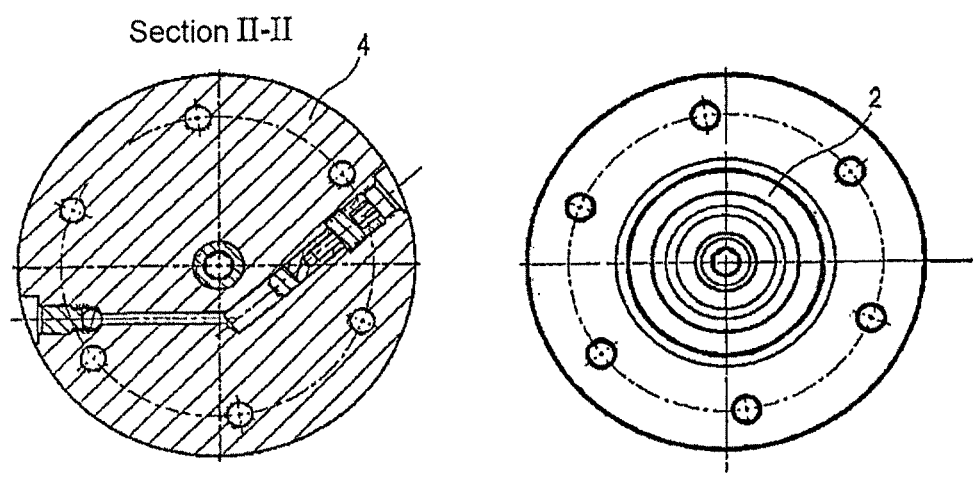
Fig. 2
Fig. 3

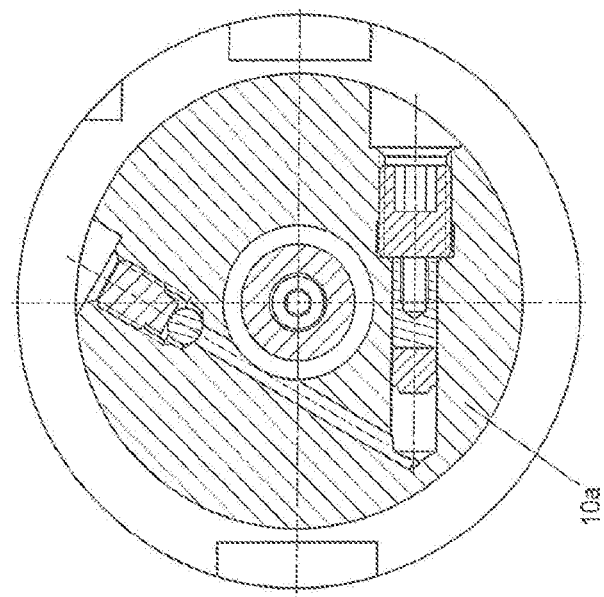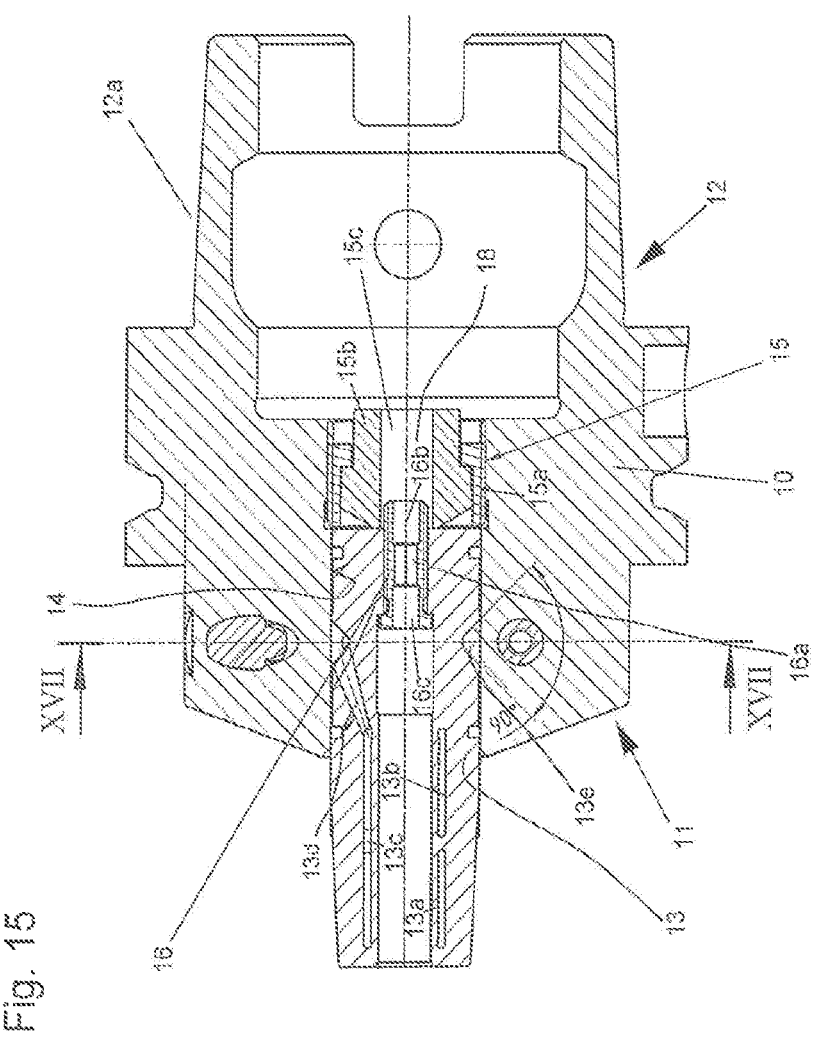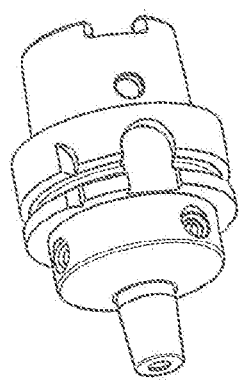

HYDRAULIC EXPANDING CHUCK

FIELD OF THE INVENTION

The present invention relates to a hydraulic expanding chuck for clamping a tool.

BACKGROUND OF THE INVENTION

Generic hydraulic expanding chucks are known for example from DE 103 12 743 A1, DE 10 2011 081 523 A1, DE 102 012 215 036 A1, DE 102 012 110 392 B4, DE 202 012 104 969 U1 or WO 2015/166062 A1. The known hydraulic expanding chucks can be functionally divided into a clamping part with an expanding bush, which comprises a centric receiving opening for receiving and clamping a tool, and a connecting part, in particular with an HSK (abbreviation for hollow shank taper) connection. The expanding bush has an annular pressure chamber which runs around the centric receiving opening, which can be subjected to fluid pressure, as a result of which the pressure chamber expands or bulges against a tool received in the centric receiving opening of the expanding bush. Through the expansion or bulging-out of the pressure chamber, the tool received in the centric receiving opening, for example a drill bit or milling cutter is non-positively clamped. By reducing the fluid pressure in the pressure chamber, the tool can be unclamped. In the direction of the centric receiving opening, the pressure chamber is limited by a separating wall that is embodied in an elastically resilient manner. Conventionally, the separating wall is formed by a clamping sleeve (see DE 103 12 743 A1, DE 10 2011 081 523 A1, DE 102 012 215 036 A1. DE 102 012 110 392 B4, DE 202 012 104 969 U1 or WO 2015/166062 A1) tightly inserted in the expanding bush of the hydraulic expanding chuck. More recent approaches aim at forming the separating wall in one piece with the expanding bush (see WO 2015/166062 A1). In this regard, a laser sintering method, precision casting method or the like is proposed in WO 2015/166062 A1.

For producing geometrical shapes, the 3D-printing technology can meanwhile be utilised. The 3D-printing technology has the advantage, in particular, that any even highly complicated geometries can be produced. Geometries, which up to now were difficult or impossible to produce in terms of production technology, can be produced by the 3D-printing technology almost without problems.

Regardless of whether the separating wall is now formed by a clamping sleeve tightly inserted in the expanding bush or by a wall region formed in one piece with the expanding bush, the separating wall in the case of the known hydraulic expanding chucks, seen in a longitudinal section through the longitudinal centre axis or axis of rotation of the hydraulic expanding chuck—comprises a middle thicker wall portion flanked by two annular grooves in the axial direction. The pressure chamber delimited in the direction of the centric receiving opening by the separating wall structured thus can thus be axially subdivided into three chamber sections, each of which run around the centric receiving opening and are connected to one another: a first annular passage with a relatively large radial extension, a centric annular passage with a relatively small radial extension and a second annular passage with a relatively large radial extension. The middle annular passage connects the first annular passage with the second annular passage.

When the pressure chamber constructed thus is subjected to a fluid pressure, the middle thicker wall portion of the separating wall is forced in the direction of the centric receiving chamber. Thus, the pressure chamber bulges out in the region of the middle thicker wall portion of the separating wall in the direction of the centric receiving chamber with the consequence that the clamping force exerted via the bulged-out separating wall on a tool received in the centric receiving opening is limited to an axially narrowly limited clamping region. This can be to the detriment of the tool clamping strength and the true running of the tool.

SUMMARY OF THE INVENTION

An object of the invention therefore is to further develop a hydraulic expanding chuck so that a tool received in the centric receiving opening of an expanding bush can be clamped over a greater axial length for increasing the tool clamping strength and the true running of the tool.

This object is solved through a hydraulic expanding chuck according to claim 1. Advantageous further developments are subject of dependent claims.

A hydraulic expanding chuck according to the invention is characterized by an expanding bush, which comprises at least two pressure chambers that can be subjected to fluid pressure, which are designed (annularly) running around the centric receiving opening, which are arranged at an axial distance from one another, and which can bulge out against a tool received in the centric receiving opening when subjected to pressure. By way of at least two pressure chambers which are axially spaced from one another, a multi-place or multi-face clamping or multiple clamping regions are achieved.

As an embodiment of the invention, a hydraulic expanding chuck for clamping a tool, for example a drill bit or a milling cutter, is made available, comprising: a front part or clamping part with an expanding bush, which comprises a centric receiving opening for receiving and clamping the tool, and a rear part or connecting part, in particular with an HSK (hollow shank taper) connection, wherein the expanding bush comprises at least two pressure chambers that can be subjected to fluid pressure, which are formed (annularly) running around the centric receiving opening, which are arranged at an axial distance from one another, which when subjected to pressure, can bulge out against the tool received in the centric receiving opening. The expanding bush, furthermore, comprises at least one passage which is not formed circularly (eccentrically or off-centre), which connects the at least two pressure chambers with one another.

In a further development of the hydraulic expanding chuck according to the invention, the at least one passage is arranged axially, i.e. parallel to the longitudinal axis of the expanding chuck. Alternatively to this, the at least one passage can also be formed in the manner of a curve or the like.

By forming the pressure chambers bulging out in the direction of the centric receiving opening in a circular manner, a circularly-acting clamping of a tool inserted in the centric receiving opening can be achieved in at least two places that are axially spaced from one another. The expansion bush can have 2, 3, 4, 5, 6, 7, 8, 9, 10, 11, 12, 13, 14, 15, 16, 17, 18, 19, 20 or any number of pressure chambers and/or 1, 2, 3, 4, 5, 6, 7, 8, 9, 10, 11, 12, 13, 14, 15, 16, 17, 18, 19, 20 or any number of passages.

By arranging multiple pressure chambers and passages, which corresponds to a highly complicated geometry, a particularly secure clamping can be achieved. By using the 3D-printing technology, such a complicated geometry can be achieved.

In this regard, the clamping part with the expansion bush and the connecting part, in particular with an HSK connection, can be produced by the 3D-printing technology.

In a further development of the hydraulic expanding chuck according to the invention, the clamping part is produced with the help of the 3D-printing technology, while the connecting part is produced by a conventional production method. By combining the 3D-printing with a conventional production technology, highly complex tool geometries can be cost-effectively produced.

In a preferred further development, the expanding bush is produced by the 3D-printing technology.

Producing a hydraulic expanding chuck or at least parts of a hydraulic expanding chuck by 3D-printing can thus be considered as an idea of the invention. By way of this, in particular complicated geometries can be realised. A part of a hydraulic expanding chuck that is important and complicated in terms of production is the passage-chamber system, which can be "inflated" by being subjected to fluid pressure for clamping an inserted tool. By using the 3D-printing technology, an optimal shaping of the passages and the chambers can be created. In particular, a multiplicity of chambers can be produced, by way of which instead of only in individual locations, any number of clamping regions can be created. The fluid for bulging the chambers can be oil, water or any other suitable mixture or liquid.

With the configurations discussed above, the expanding bush can have been produced in one piece with the clamping part or be produced initially separately from the clamping part, but then have been integrated in the clamping part. The latter alternative offers the possibility of configuring the hydraulic expanding chuck according to the invention in a modular manner. In a preferred embodiment, the hydraulic expanding chuck according to the invention can therefore be embodied in a modular manner from a basic body, which as integral part can include the clamping part and/or the connecting part, and an expanding bush inserted in a centric receiving opening in the basic body. To this end, the expanding bush can be fixed in the centric receiving opening on the basic body side in a positively locked, non-positively locked and/or materially bonded manner.

An axial stop provided on the basic body side for fixing the axial position of the expanding bush in the basic body can facilitate the assembly of the hydraulic expanding chuck. This axial stop which is assigned to the expanding bush and provided on the basic body side can comprise a screw element screwed into the basic body and a preferentially elastic support element pressed against the expanding bush by the screw element. The screw element makes possible an axial bracing of the support element against the expanding bush in order to achieve that the expanding bush lies against the axial stop in a close or fluid-tight manner. This further development offers the possibility of incorporating the axial stop provided on the basic body side for a cooling lubricant supply of a tool clamped in the expanding bush described later on.

In particular when the connecting part comprises an HSK connection, the screw element can be practically actuated from the side of the connecting part. An HSK connection offers a simple possibility for installing and actuating the screw element and support element in the basic body.

Alternatively to or additionally to the axial stop assigned to the expanding bush and provided on the basic body side, the hydraulic expanding chuck can comprise its own axial stop assigned to the tool to be clamped in the expanding bush, i.e. provided on the expanding bush side, for fixing the axial position of the tool in the expanding bush. The axial stop assigned to the tool on the expanding bush side offers the possibility of fixing the axial position of the tool (prior to the clamping) to be clamped in the expanding bush.

Analogously to the axial stop on the basic body side, the axial stop provided on the expanding bush side can be screwed to the expanding bush for this purpose, i.e. be formed for example by a setscrew screwed into the expanding bush, wherein the actuation of the setscrew can be practically effected from the side of the connecting part.

Independently of the configurations discussed above, the hydraulic expanding chuck according to the invention can comprise a centrically extending cooling lubricant supply passage for supplying a tool clamped in the expanding bush with cooling lubricant. Depending on the concrete configuration, the centrically extending cooling lubricant passage can extend from a feed opening on the connecting part side, which is located for example within the HSK connection, as far as to a mouth opening, which lies for example in an axial stop assigned to the tool to be clamped, e.g. setscrew.

BRIEF DESCRIPTION OF THE DRAWINGS

Further details and advantages become clear by way of the embodiments shown in the drawings. It shows FIG. 1 a part longitudinal sectional representation of a hydraulic expanding chuck according to a first embodiment, FIG. 2 a cross sectional representation through the hydraulic expanding chuck in the place marked II-II in FIG. 1, FIG. 3 a front view of the hydraulic expanding chuck (FIG. 1: arrow III), FIG. 4 a perspective front view of the hydraulic expanding chuck, FIG. 5 a perspective longitudinal section representation of a front part (clamping part) of a hydraulic expanding chuck according to a second embodiment, FIG. 6 a longitudinal section representation of the front part (clamping part), FIG. 7 a perspective rear view of the clamping part produced with the help of a 3D-printing technology in a state immediately after the 3D-print, FIG. 8 a longitudinal sectional representation of the hydraulic expanding chuck formed of the front part (clamping part) and a rear part (connecting part), FIG. 9 a longitudinal sectional representation of the clamping part in a state immediately after the 3D-print in a position in which in FIG. 4, FIG. 6 or FIG. 8 it is rotated about the longitudinal centre axis of the hydraulic expanding chuck compared with the representation, FIG. 10 a perspective part longitudinal section of an expanding bush through the front part (clamping part) of the hydraulic expanding chuck, FIG. 11 a further perspective part longitudinal section of the expanding bush in a position in which compared with the representation in FIG. 10 it is slightly rotated about the longitudinal centre axis of the hydraulic expanding chuck, FIG. 12 a perspective cross sectional representation of the expanding bush in the location marked VII-VII in FIG. 10, FIG. 13 a further perspective cross sectional representation of the expanding bush in the location marked XIII-XIII in FIG. 10, FIG. 14 a further perspective cross sectional representation of the expanding bush in the location marked XIV-XIV in FIG. 10, FIG. 15 a longitudinal sectional representation of a hydraulic expanding chuck according to a third embodiment, FIG. 16 a perspective representation of the hydraulic expanding chuck from FIG. 15, and FIG. 17 a cross sectional representation in the location marked XVII-XVII in FIG. 15.

EMBODIMENTS

First Embodiment

FIG. 1 shows a hydraulic expanding chuck according to a first embodiment with an expanding bush 1 in a front part (clamping part) 3 and an HSK connection 2 in a rear part (connecting part) 4. The front part 3 is produced in 3D-printing technology, while the rear part 4 is produced in a conventional production method.

As is evident in FIG. 1, the expanding bush 1 comprises two annular pressure chambers running around a centric receiving opening arranged at an axial distance from one another, which can be subjected to fluid pressure, as a result of which the pressure chambers expand or bulge out against a tool (not shown) which is received in the centric receiving opening of the expanding bush 1. Through the expansion or bulging-out of the pressure chambers, the tool, for example a drill bit or milling cutter, is non-positively clamped. By reducing the fluid pressure in the pressure chambers, the tool can be unclamped. In the direction of the centric receiving opening, the pressure chambers are each delimited by a separating wall that is embodied resiliently. The two pressure chambers are in connection with one another indicated in FIG. 1 by a bold black line. A fluid feed line that is likewise visible in FIG. 1 leads to the in FIG. 1 left, front pressure chamber. In contrast with the two pressure chambers, the connecting passage is not arranged circularly but eccentrically or off-centre, and runs parallel to the longitudinal centre axis of the hydraulic expanding chuck.

FIG. 2 shows a cross section of the hydraulic expanding chuck in the location marked II-II in FIG. 1. Visible are the feed lines of the fluid to the pressure chambers in the expanding bush. FIG. 2, furthermore, shows a centrically arranged setscrew which forms an axial stop for a tool to be clamped in the expanding bush 1.

FIG. 3 shows a front view of the hydraulic expanding chuck (FIG. 1: arrow III).

Figure 4:
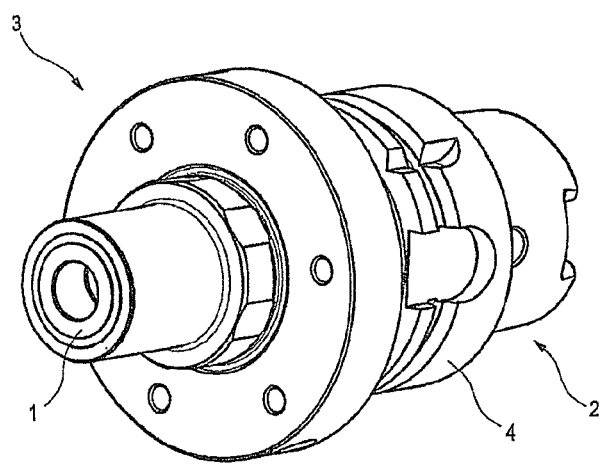

FIG. 4 shows in a perspective front view the hydraulic expanding chuck with the front part 3, in which the expanding bush 1 is arranged, and the rear part 4 with in particular the HSK connection 2.

Second Embodiment

Figure 5:
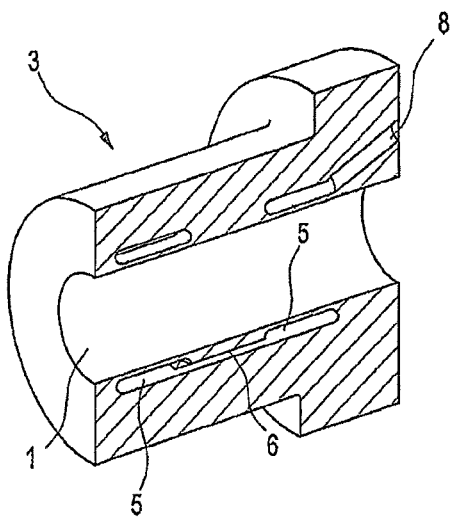

FIG. 5 shows a perspective representation of the front part (clamping part) 3 of a hydraulic expanding chuck according to a second embodiment with an expanding bush 1, two pressure chambers 5, three connecting passages 6 (see FIGS. 13 and 14 in this regard) and a feed line 8. The pressure chambers 5 are provided for receiving a fluid, in particular oil or water. By receiving the fluid, the pressure chambers 5 bulge out towards the inside in the direction of the centric receiving opening, as a result of which in these places the clear diameter of the expanding bush 1 diminishes. By way of this, clamping of an inserted tool can take place. By arranging multiple, in the shown embodiment, two chambers 5, multiple, in the shown embodiment two regions with reduced clear diameter during the clamping can be achieved, as a result of which compared with the hydraulic expanding chuck discussed at the outset, extensive clamping of the tool concerned is obtained. In particular, compared with the hydraulic expanding chucks of the prior art, in the case of which basically only a single pressure chamber bulges out towards the inside, extensive clamping can be achieved. By way of an extensive clamping, a symmetrical clamping can be ensured as a result of which a very good true running of the tool concerned is obtained. Apart from this, great stability can be achieved which results in a high production precision. In a particular embodiment, the connecting passages 6 can advantageously be approximately 3 mm wide and approximately 3 mm high. The pressure chambers 5 can have these dimensions or be dimensioned larger in a further advantageous embodiment.

Figure 6:
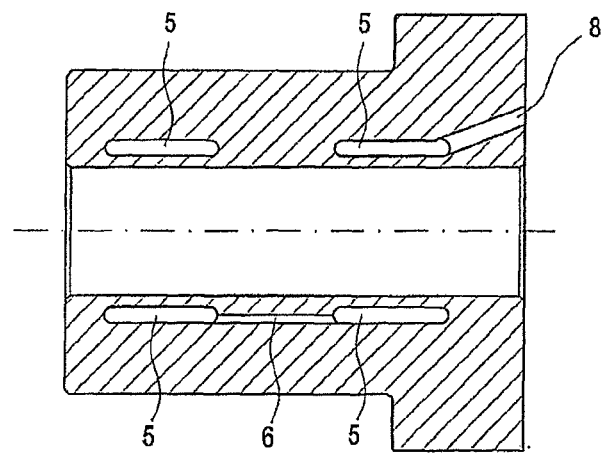

FIG. 6 shows in a longitudinal section the two pressure chambers 5 and one of the three connecting passages 6. The feed line 8 supplies the pressure chambers 5 and the connecting passages 6 with a fluid, for example oil or water.

Figure 7:
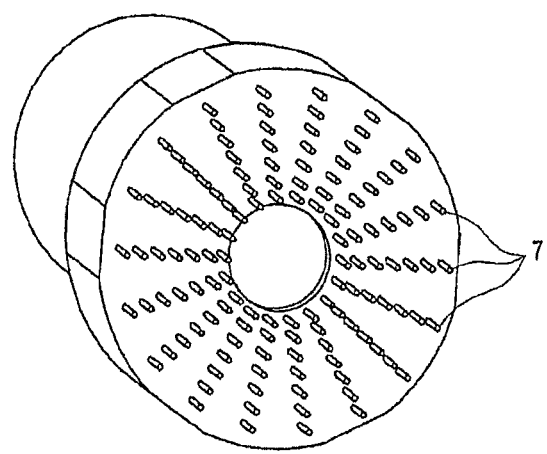

FIG. 7 shows a perspective rear view of the front part (clamping part) of the hydraulic expanding chuck. Advantageously, only the front part is embodied as 3D-print. The rear part can be produced in conventional technology. Because of this, the front part with complicated geometry can be constructed as 3D-print. In an alternative embodiment, the complete hydraulic expanding chuck can be produced as 3D-print.

Figure 8:
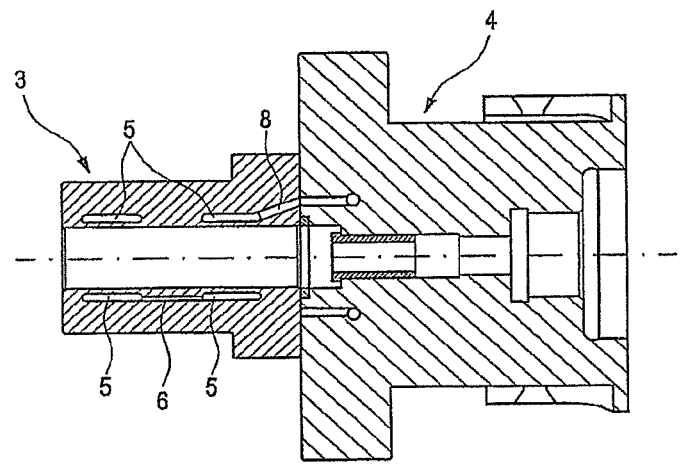

FIG. 8 shows the hydraulic expanding chuck in a longitudinal sectional representation with the front part 3 with pressure chambers 5 and one of the connecting passages 6 and the rear part 4 in an assembled state. For feeding a fluid into the pressure chambers 5 or connecting passages 6, a further line 8 can be provided.

Figure 9:
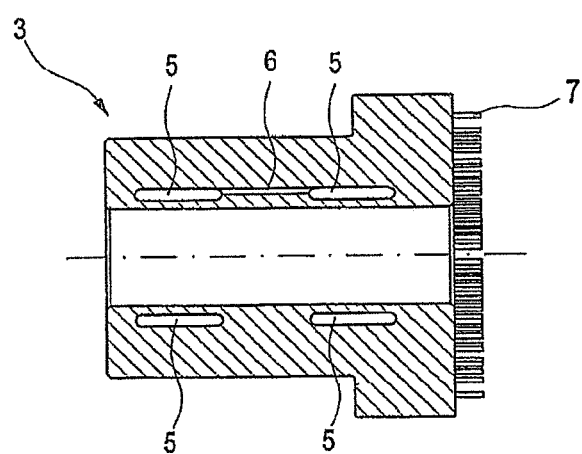

FIG. 9 shows a longitudinal sectional representation of the front part with pressure chambers 5 and one of the connecting passages 6. The front part can comprise pins 7 for connecting the front part to the rear part.

Figure 10:
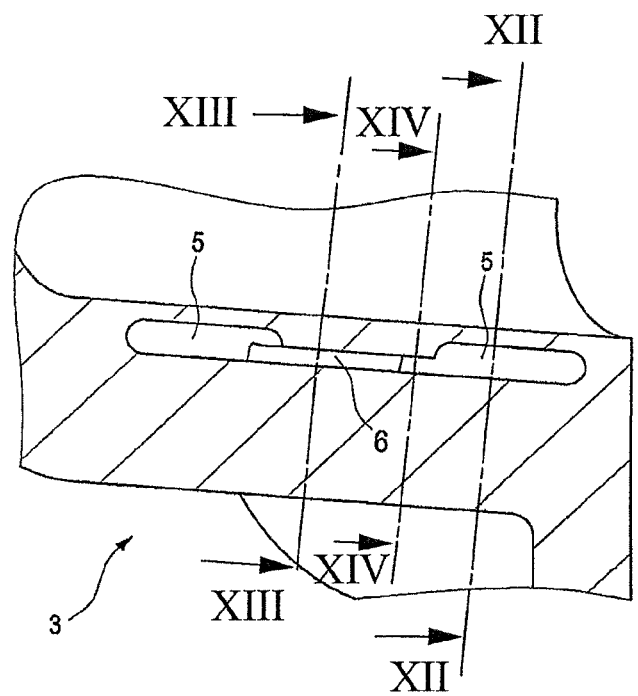

FIG. 10 shows a partly perspective longitudinal section of the front part of the hydraulic expanding chuck with pressure chambers 5 for receiving a fluid and one of the connecting passages 6. By receiving the fluid, the pressure chambers 5 can be bulged out towards the inside directed into the centre of the expanding chuck, as a result of which a tool inserted in the centric receiving opening can be clamped. The connecting passage 6 connects the two adjacent pressure chambers 5 so that the fluid can spread from one pressure chamber 5 to the next pressure chamber 5. By way of this it can be ensured that all pressure chambers 5 are filled with fluid. The pressure chambers 5 can be designed circularly, in particular cylindrically. The connecting passages 6 in particular extend axially and are not formed circularly.

Figure 11:
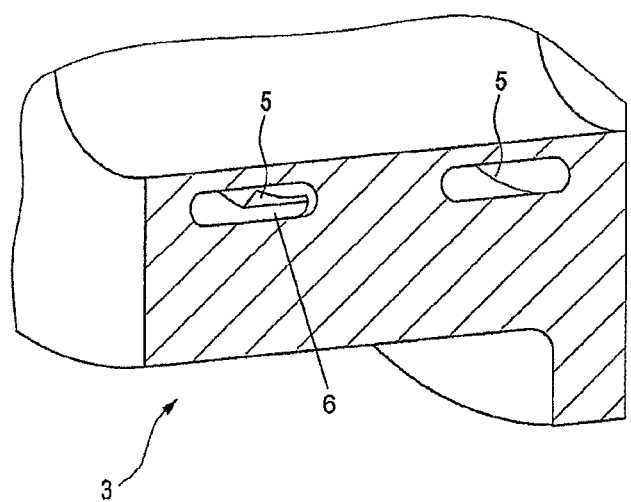

FIG. 11 shows a further perspective part longitudinal section of the front part of the hydraulic expanding chuck, wherein this longitudinal section compared with the longitudinal section of FIG. 10 is slightly rotated about the longitudinal centre axis of the hydraulic expanding chuck. Shown are the two pressure chambers 5. By contrast with the representation in FIG. 10, the connecting passage 6 is only visible rudimentarily. The pressure chambers 5 have a cylindrical form and are therefore visible in every longitudinal section. In contrast with this, the connecting passages 6 are formed running eccentrically axially and are therefore not visible in every longitudinal section. The connecting passages can be arranged offset by 120°, wherein in this case, as in the shown embodiment, three connecting passages are arranged in the circumferential direction of the hydraulic expanding chuck roundabout the centric receiving opening.

Figure 12:
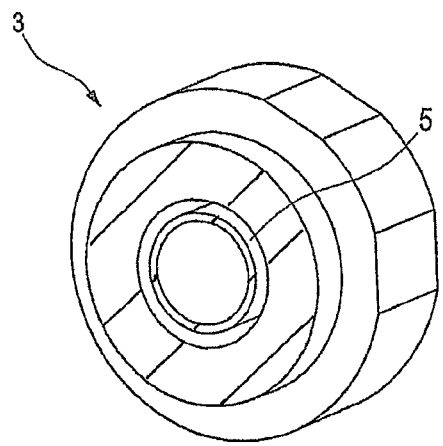

FIG. 12 shows a perspective cross section through the front part 3 of the hydraulic expanding chuck marked XII-XII in FIG. 10, which was produced by 3D-printing. One of the two pressure chambers is shown, which is designed cylindrically and circularly. By way of this, the pressure chamber 5, on being filled with fluid, can ensure a non-positive clamping from all sides of a tool, for example a drill bit or a milling cutter, inserted in the centric receiving opening of the expanding bush of the hydraulic expanding chuck.

Figure 13:
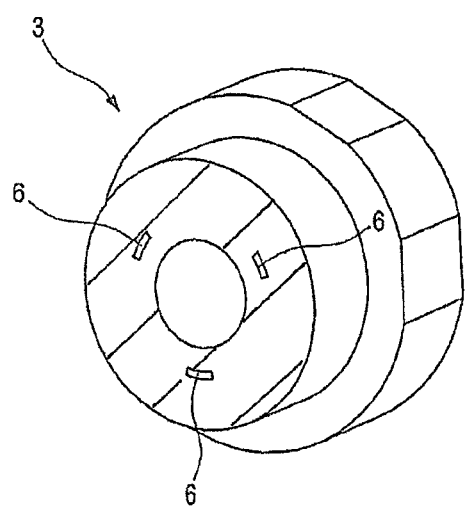

FIG. 13 shows a further perspective cross section through the front part of the hydraulic expanding chuck marked XIII-XIII in FIG. 10, in which three eccentrically arranged connecting passages are visible, which are formed extending axially. The connecting passages 6 extend axially, i.e. in contrast with the pressure chambers 5, not circularly.

Figure 14:
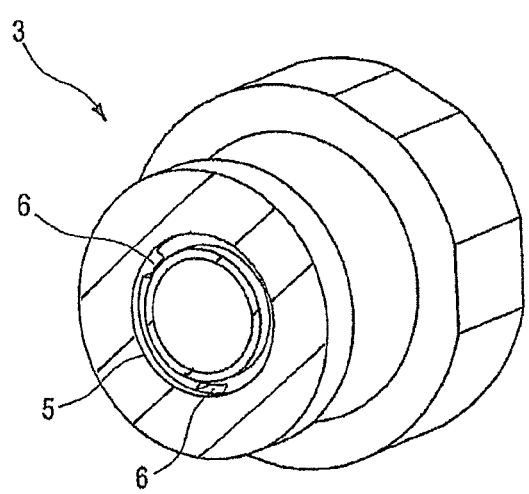

FIG. 14 shows a further perspective cross section marked XIV-XIV in FIG. 10, in which the in FIG. 10 rear pressure chamber 5 and two of the connecting passages 6 in the expanding bush of the front part 3 of the hydraulic expanding chuck are visible.

Third Embodiment

FIG. 15 shows a longitudinal sectional representation of a hydraulic expanding chuck according to a third embodiment, which differs from the first and second embodiment substantially by a modular construction. FIG. 16 shows a perspective representation of the hydraulic expanding chuck from FIG. 15, while FIG. 17 shows a cross sectional representation in the location marked XVII-XVII in FIG. 15.

In contrast with the first and second embodiment, in which the expanding bush is produced in one piece with the clamping part or is an integral part of the clamping part, the expanding bush in the third embodiment is an independent component produced separately from the clamping part, which is integrated by insertion in the clamping part as shown in FIG. 15.

In the third embodiment, the hydraulic expanding chuck in particular comprises a basic body 10, which as integral parts comprises a clamping part 11 and a connecting part 12. In the region of the clamping part 11, the basic body 10 comprises a centric receiving opening 14, into which an expanding bush 13 with a defined clearance, transition or shrink fit is inserted and positively locked, non-positively locked (for example by shrinking) and/or materially bonded (for example by soldering).

As shown by FIG. 15, the expanding bush 13 comprises two annular (circular) pressure chambers 13a, 13b which are arranged at an axial distance from one another, which are fluid-connected to one another via at least one eccentrically positioned (i.e. not circular) axially-extending connecting passage 13c. Subjecting the two chambers 13a, 13b to pressure is effected via a feed line 13d on the expanding bush-side, which opens into a circular V-shaped annular groove 13e on the outer circumference of the expanding bush 13. The annular groove 13e is supplied with fluid in the known manner or subjected to fluid pressure via a passage system 10a formed on the basic body side which is illustrated in FIG. 17. When both pressure chambers 13a, 13b are subjected to pressure, the pressure chambers 13a, 13b bulge out towards the inside as a result of which a tool received in the centric receiving opening is non-positively clamped in two places or clamping regions located spaced from one another.

The axial position of the expanding bush 13 is fixed by an axial stop 15 provided in the basic body 10, which in the shown embodiment is formed of a sleeve-shaped screw element 15a and a likewise sleeve-shaped elastic support element 15b, on which the expanding bush 13 is axially braced for clamping. The screw element 15a is put over the support element 15b and pushes the support element 15b against the expanding bush 13 thanks to the elasticity of the support element 15b, a fluid-tight connection between the support element 15b and the expanding bush 13 can be achieved.

In the shown embodiment, in which the connecting part 12 has an HSK connection 12a, the screw element 15a can be practically actuated from the side of the connecting part 12.

As is shown in FIG. 15, the expanding bush 13 comprises an axial stop 16 which is assigned to a tool to be clamped in the expanding bush, i.e. provided on the expanding bush side, which axial stop 16 fixes the axial length of the tool in the expanding bush 13. In the shown embodiment, the axial stop 16 provided on the expanding bush side is screwed to the expanding bush and in particular formed by a setscrew screwed into the expanding bush 13. Actuating the setscrew 16 can be effected in the shown embodiment both from the side of the connecting part 12 and also from the side of the clamping part 11 or the side of the expanding bush 13. For this purpose, an engagement opening 16a, for example internal hexagonal opening, is provided in the setscrew 16 for this purpose. As shown by FIG. 15, the setscrew 16 projects into the sleeve-shaped support element 15b.

The hydraulic expanding chuck shown in FIG. 15, is characterized, furthermore, by a centrically extending cooling lubricant supply passage 18 for supplying a tool clamped into the expanding bush 13 with cooling lubricant. The centrically extending cooling lubricant passage 18 leads through an axial passage 15c, for example bore, in the sleeve-shaped support element 15b and a in FIG. 15 right bore section 16b, the engagement opening 16a and a in FIG. 15 left bore section 16c in the setscrew 16. The bore sections 16b, 16c have a sufficiently large bore diameter in order to be able to engage with a suitable tool key in the engagement opening 16a located between the two bore sections 16b, 16c. The in FIG. 15 right end of the passage 15c of the sleeve-shaped support element 15b corresponds to a feed opening on the connecting part side, the in FIG. 15 left end of the bore section 16c to a mouth opening on the expanding bush side.

The invention claimed is:

1. A hydraulic expanding chuck for clamping a tool, the chuck comprising:
   an expanding bush, which comprises a centric receiving opening for receiving and clamping the tool, and
   a connecting part,
   the expanding bush comprising at least first and second pressure chambers, the first and second pressure chambers each annularly formed about the centric receiving opening, the first and second pressure chambers arranged at an axial distance from one another, and the first and second pressure chambers, when subjected to a pressure, can bulge out against a tool received in the centric receiving opening,
   the first and second pressure chambers are connected with one another by at least a first passage that is non-annular,
   a feed line is connected to the first pressure chamber and is indirectly connected to the second pressure chamber via the first pressure chamber, the expanding bush is a one-piece integral structure that defines the first and second pressure chambers, the first passage, and the feed line, the feed line extends from a first location, where the feed line connects to the first pressure chamber, to a second location, the first location is spaced axially a first distance from the second pressure chamber, the second location is spaced axially a second distance from the second pressure chamber, the second distance is larger than the first distance, the first location is spaced radially a third distance from an axis of the centric receiving opening, the second location is spaced radially a fourth distance from the axis of the centric receiving opening, the fourth distance is larger than the third distance, and the feed line has a substantially constant rate of taper from the first location to the second location.

2. The hydraulic expanding chuck according to claim 1, wherein the passage is arranged axially.

3. The hydraulic expanding chuck according to claim 1, wherein the expanding bush comprises more than two pressure chambers and/or multiple passages.

4. The hydraulic expanding chuck according to claim 1, wherein the expanding bush and/or the connecting part are/is produced by 3D-printing.

5. The hydraulic expanding chuck according to claim 1, wherein at least one part of the hydraulic expanding chuck is produced by 3D-printing.

6. The hydraulic expanding chuck according to claim 5, wherein the expanding bush is produced by 3D-printing.

7. The hydraulic expanding chuck according to claim 1, wherein the hydraulic expanding chuck comprises an integral one-piece basic body, which comprises the expanding bush and the connecting part.

8. The hydraulic expanding chuck according to claim 7, wherein the expanding bush is arranged in the centric receiving opening in a positively locked, non-positively locked and/or materially bonded manner.

9. The hydraulic expanding chuck according to claim 7, wherein the hydraulic expanding chuck comprises an axial stop assigned to the expanding bush for fixing an axial position of the expanding bush in the basic body.

10. The hydraulic expanding chuck according to claim 9, wherein the axial stop assigned to the expanding bush comprises a screw element screwed into the basic body and a support element pressed against the expanding bush by the screw element.

11. The hydraulic expanding chuck according to claim 10, wherein the screw element can be actuated from the side of the connecting part.

12. The hydraulic expanding chuck according to claim 1, wherein the hydraulic expanding chuck comprises a centrically extending cooling lubricant supply passage for supplying a tool clamped in the expanding bush with cooling lubricant.

13. The hydraulic expanding chuck according to claim 1, wherein the hydraulic expanding chuck is for clamping a drill bit or a milling cutter.

14. The hydraulic expanding chuck according to claim 1, wherein the connecting part comprises an HSK connection.

15. The hydraulic expanding chuck according to claim 1, wherein:
the first passage is at a first angular position,
the feed line is directly connected to the first pressure chamber at a second angular position, and
the first angular position differs from the second angular position.

16. The hydraulic expanding chuck according to claim 1, wherein:
a line extending along points of the first passage that are farthest from the centric receiving opening extends along radially outermost portions of the first and second annular pressure chambers.

17. A hydraulic expanding chuck for clamping a tool, the chuck comprising:
an expanding bush, which comprises a centric receiving opening for receiving and clamping the tool,
a connecting part,
a setscrew,
a sleeve-shaped screw element, and
a sleeve-shaped elastic support element,
the expanding bush comprising at least first and second pressure chambers, the first and second pressure chambers each annularly formed about the centric receiving opening, the first and second pressure chambers arranged at an axial distance from one another, and the first and second pressure chambers, when subjected to a pressure, can bulge out against a tool received in the centric receiving opening,
the first and second pressure chambers are connected with one another by at least a first passage that is non-annular,
a feed line is connected to the first pressure chamber and is indirectly connected to the second pressure chamber via the first pressure chamber,
the expanding bush is a one-piece integral structure that defines the first pressure chamber, the first passage and the second pressure chamber,
the feed line extends from a first location, where the feed line connects to the first pressure chamber, to a second location,
the first location is at an axial extremity of the first pressure chamber, remote from the second pressure chamber,
the first location is spaced a first distance from an axis of the centric receiving opening, the second location is spaced axially a second distance from the axis of the centric receiving opening, and the second distance is larger than the first distance,
the setscrew forms a first axial stop for a tool to be clamped in the expanding bush, and
the sleeve-shaped screw element pushes the sleeve-shaped elastic support element against the expanding bush.

18. The hydraulic expanding chuck according to claim 17, wherein the setscrew can be actuated from the side of the connecting part.

19. A hydraulic expanding chuck for clamping a tool, the chuck comprising:
an expanding bush, which comprises a centric receiving opening for receiving and clamping the tool,
a connecting part, and
a setscrew,
the expanding bush comprising at least first and second pressure chambers, the first and second pressure chambers each annularly formed about the centric receiving opening, the first and second pressure chambers arranged at an axial distance from one another, and the first and second pressure chambers, when subjected to a pressure, can bulge out against a tool received in the centric receiving opening,
the first and second pressure chambers are connected with one another by at least a first passage that is non-annular, a feed line is connected to the first pressure chamber and is indirectly connected to the second pressure chamber via the first pressure chamber, the expanding bush is a one-piece integral structure that defines the first pressure chamber, the first passage and the second pressure chamber, the feed line extends from a first location, where the feed line connects to the first pressure chamber, to a second location, the first location is at an axial extremity of the first pressure chamber, remote from the second pressure chamber, the first location is spaced a first distance from an axis of the centric receiving opening, the second location is spaced axially a second distance from the axis of the centric receiving opening, and the second distance is larger than the first distance, the setscrew forms an axial stop for a tool to be clamped in the expanding bush, and the setscrew can be actuated from the side of the connecting part.

\* \* \* \* \*